DETECTED NOISE ACTUATED, AGC NOISE-QUIETING ACTION DEPENDENT, AND TOTAL NOISE LEVEL ADAPTIVE RF RECEIVER SQUELCH SYSTEM

Filed Nov. 28, 1962 2 Sheets-Sheet 1

INVENTOR
HARLAN G. MICHAEL

BY Woodling and Krost [signature]
ATTORNEYS

INVENTOR
HARLAN G. MICHAEL
BY Moody and Kintzinger
ATTORNEYS

United States Patent Office 3,188,571
Patented June 8, 1965

3,188,571

DETECTED NOISE ACTUATED, AGC NOISE-QUIETING ACTION DEPENDENT, AND TOTAL NOISE LEVEL ADAPTIVE RF RECEIVER SQUELCH SYSTEM

Harlan G. Michael, Marion, Iowa, assignor to Collins Radio Company, Cedar Rapids, Iowa, a corporation of Iowa Filed Nov. 28, 1962, Ser. No. 240,512
4 Claims. (Cl. 325—402)

Figure 1:
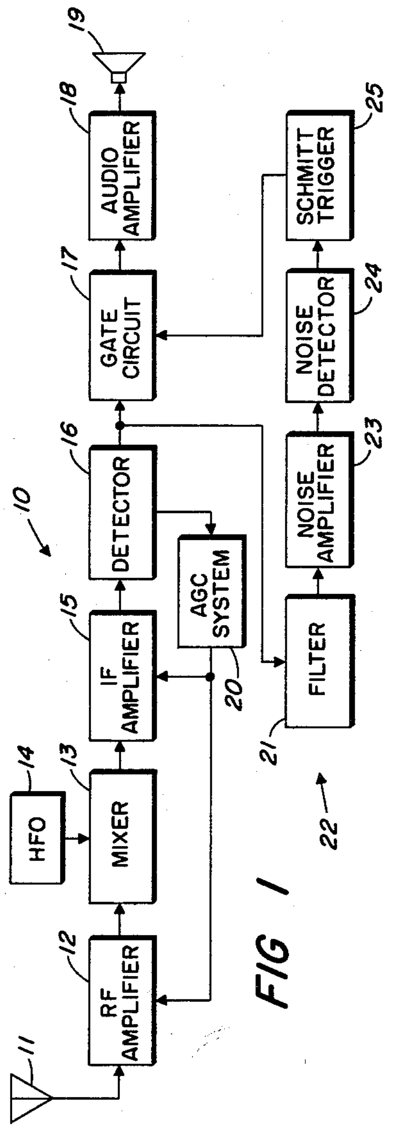

This invention relates in general to carrier-to-noise (*C/N*) squelch systems, and in particular to a squelch system differing from a true *C/N* squelch as determined by an interdependent dynamic operational relation to AGC noise-quieting action in a total noise level adaptive RF receiver squelch system.

VHF and UHF receivers generally utilize a squelch for suppressing noise when no signal is being received. Desired squelch features include rapid turn-on and turn-off action free from clicks, pops and thumps; immunity to turn-on by high ambient noise, atmospheric, cosmic, or man-made; and a turn-on threshold adjustable for a preselectible intelligibility level not subject to change with receiver gain changes, or by ambient noise level variations. Various combinations of these desired squelch system features are handled by various known squelch systems and with varying degrees of success by the respective squelch systems.

Reference is made to various squelch systems well known in the art including "Carrier Squelch"; "Signal-Plus-Noise to Noise Squelch"; and "Coherent Carrier Squelch" (CODAN).

Carrier squelch circuits normally derive their operating voltage from a receiver AGC line. Such a squelch generally operates on the sum of carrier and noise at the receiver I-F output. Thus, this squelch may be operated by noise alone with high ambient noise, or with increased receiver gain. Furthermore, particularly with multichannel equipment, gain and the squelch threshold may vary considerably from channel to channel and adjustment is required for varying the threshold in accordance with the particular noise level and receiver gain at any given time. Such an adjustment requirement is particularly undesirable with remote receiving equipment where manual adjustment can be made only periodically, or, for that matter, in aircraft where the ambient noise level changes as the plane alternately flies over cities and open rural areas.

Signal-plus-noise to noise squelch normally operates at a fixed ratio of audio signal to noise at the receiver detector output. Most VHF-UHF receivers utilizing this type of squelch have an I-F bandwidth considerably greater than that required for passing audio. Noise above the highest audio frequency is separated from the audio and noise below the highest audio and the two outputs compared after detection and filtering. A predetermined fixed ratio of signal-plus-noise to noise operates the squelch in a better manner than the carrier squelch system described above when handling wide-band white noise or when noise varies with changing receiver gain. Still, however, various types of pulse noise, including ignition noise, may remove the squelch since the pulse repetition frequency generally is low enough to appear primarily in the detected audio. Simultaneous reception of two carries on the same channel is prevented if the frequency difference is equal to a frequency high enough to be above audio, because the resulting beat note is sensed as noise by the squelch. Delayed turn-off must be provided to prevent dropout between words and this causes and undesired short period of unwanted noise following each transmission.

Coherent carrier squelch (CODAN) ignores all types of noise completely and is operated as a function of carrier level at the receiver I-F ouptut. Immunity to noise is provided in some "CODAN" systems by utilization of a very narrow selective filter passing only the desired carrier. This leads to complication in providing such operation in conventional VHF-UHF receivers where the carrier at the I-F output may vary several kcs. with normally acceptable transmitter and receiver frequency tolerances. The squelch intelligibility level is not fixed since a changing noise level at the receiver input has no effect on the amount of carrier required for turn-on. Furthermore, the turn-on threshold varies with variation in receiver gain.

Thus, it appears that many existing squelch systems fall short in having desired squelch features and some desired features are only partially satisfied.

It is therefore, a principal object of this invention to provide an RF receiver squelch system adaptive to total noise level, providing a substantially constant preset level of intelligibility threshold operation, substantially unaffected by receiver gain variation under normal operating conditions, and having fast attack and release times.

A further object is to provide such an RF receiver squelch system that is fail safe, and that does not have an absolute requirement for external control although a threshold adjustment may be provided.

A further object is to prevent accidental removal of squelch by ignition noise or any other high level ambient noise in a squelch that performs equally well for VHF and UHF AM receivers.

Features of this invention useful in accomplishing the above objects with a squelch system in a tuned radio frequency receiver, or in a superheterodyne receiver, includes utilization of an automatic gain control, a gate circuit, an audio output, and a squelch circuit. The squelch circuit is responsive to detected and filtered noise above audio within the bandpass of the radio frequency and/or I-F staging of the receiver, and has a noise detector providing a variable D.C. output for operating a trigger and the gate circuit.

Figure 2:
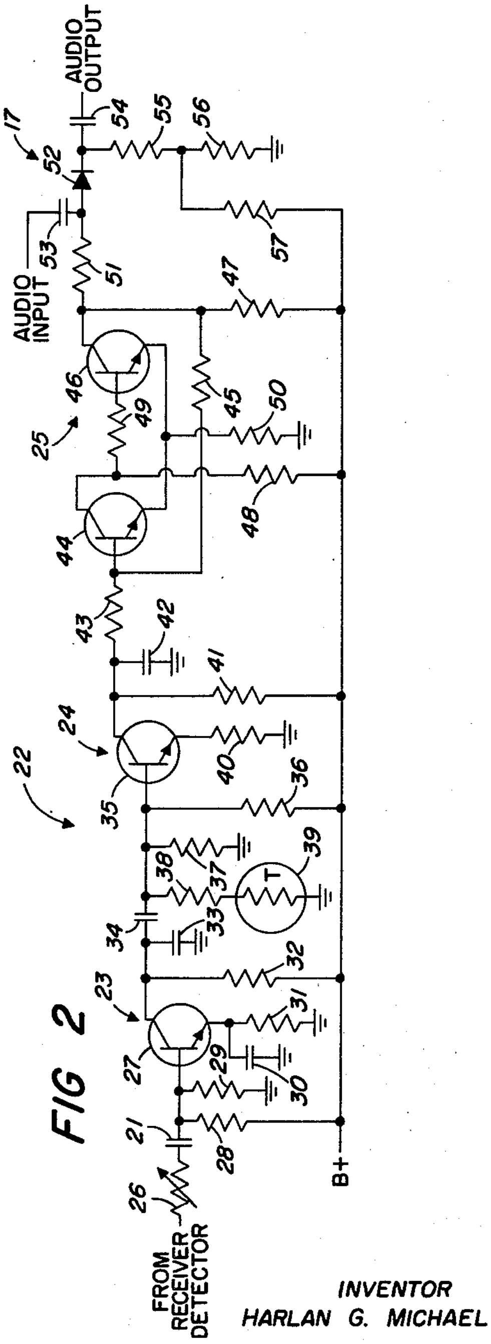
Figure 3:
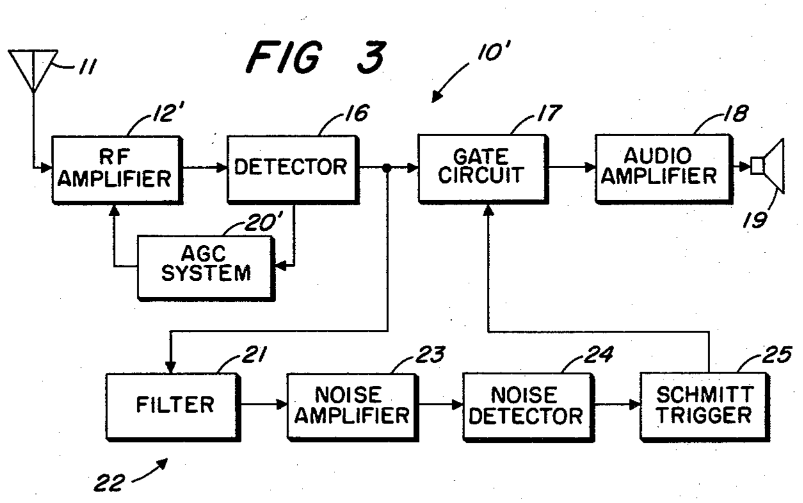
Figure 4:
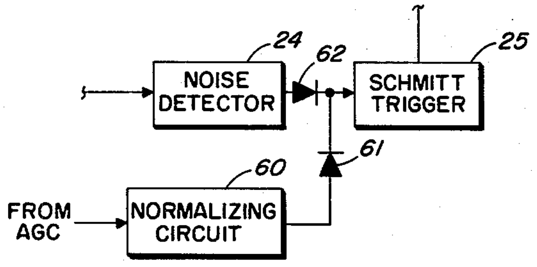

Specific embodiments representing what are presently regarded as the best modes for carrying out the invention are illustrated in the accompanying drawings:

In the drawings:

FIGURE 1 represents a superheterodyne radio receiver equipped with AGC and a noise squelch circuit connected to a receiver detector;

FIGURE 2, a detailed schematic of the noise squelch circuit of FIGURE 1;

FIGURE 3, a tuned RF receiver equipped with AGC and a noise squelch circuit connected to a receiver detector; and FIGURE 4, a partial view showing a conventional carrier type squelch combined with the quelch circuit of either FIGURE 1, or FIGURE 3, for providing override carrier squelch when two carriers are received simultaneously, having amplitude of like magnitude, and with a difference frequency above the lower threshold of the squelch circuit filter.

Referring to the drawings:

The superheterodyne receiver 10 of FIGURE 1 receives an RF signal from antenna 11. The RF signal is fed through RF amplifier 12 to mixer 13 where it is mixed with the high frequency signal of oscillator 14. The output of mixer 13 is fed to I-F amplifier 15. The output of the I-F amplifier 15 is passed successively through detector 16, gate circuit 17, and audio amplifier 18 to speaker 19. An AGC circuit 20 provides for applying automatic gain control signal voltage, derived from detector 16, to the I-F amplifier 15 and RF amplifier 12 in a conventional manner. The output of detector 16 is also applied to the filter 21 of squelch circuit 22.

Filter 21, which may be a highpass filter or a bandpass filter, effectively blocks audio and passes noise signal out of detector 16 above audio to noise amplifier 23. Amplifier 23 increases the noise power out of detector 16 to a level sufficient for operating the following noise detector stage 24. Noise detector 24 converts noise passed from noise amplifier 23 to a D.C. voltage useful for operating Schmitt trigger 25 for control of gate circuit 17.

Referring also to FIGURE 2, the squelch circuit 22 is shown to be provided with a threshold adjustable input resistor 26 which is connected through a capacitor, comprising filter 21, to the base of transistor 27. The junction of capacitor 21 and the transistor 27 is connected to the junction of a pair of resistors 28 and 29, serially connected between B+ supply and ground. The emitter of the noise amplifier 23 transistor 27 is connected through capacitor 30 and resistor 31 in parallel to ground. The collector of transistor 27 is connected through resistor 32 to B+ supply, through capacitor 33 to ground, and through capacitor 34 to the base of transistor 35 of noise detector 24. The capacitor 34 and the base of transistor 35 are connected through resistor 36 to B+ supply, and through resistor 37, in parallel with serially connected resistor 38 and thermistor 39, to ground. The emitter of transistor 35 is connected through resistor 40 to ground.

The collector of transistor 35 is connected through resistor 41 to B+ supply, through capacitor 42 to ground, and through resistor 43 to the base of transistor 44 of Schmitt trigger 25. The junction of resistor 43 and the base of transistor 44 is additionally connected through resistor 45 to the collector of Schmitt trigger transistor 46. The collector of transistor 46 is also connected through resistor 47 to B+ supply. The collector of transistor 44 is connected to B+ supply through resistor 48 and also to the base of transistor 46 through resistor 49. The emitters of transistor 44 and transistor 46 are connected together and through resistor 50 to ground. The collector of Schmitt trigger transistor 46 is connected through resistor 51 to the anode of diode 52 of gate circuit 17. Audio input is passed to the anode of diode 52 through capacitor 53 and the audio output is passed from the cathode of diode 52 through capacitor 54 in a conventional manner when diode 52 is biased to a state of conduction. The cathode of diode 52 is connected serially through resistors 55 and 56 to ground, and from the junction of resistors 55 and 56 through resistor 57 to B+ supply.

Operation of this receiver squelch system is dependent upon the noise-quieting action of the AGC circuit 20, and the squelch circuit 22 is responsive to variations in the noise out of receiver detector 16 through a predetermined power level for controlling gate circuit 17. Generally, the squelch circuit 22 would be set to a squelch threshold below the internal noise level of the receiver, that is, below internal noise of the stages of the receiver through the detector and including temperature noise of the antenna, when no signal is being received. This may be done in such a manner that the squelch gate is fail safe and the audio circuit would not be squelched, should for some reason the squelch circuit 22 not be functioning. With this system, whenever ambient noise is sensed by the antenna 11 without a carrier signal present, although AGC action may tend to attenuate the internal noise factor to some extent, the noise level sensed by the squelch circuit 22 would generally maintain the gate circuit 17 in the squelched state. However, when a carrier is received of sufficient strength to provide a detected output at a desired intelligibility level AGC noise-quieting action so decreases the internal noise from stages of the receiver and from the antenna, out of detector 16 and passed by filter 21, as to remove the squelch. Thus, an operator is not unduly annoyed by unnecessary noise and can concentrate on receiving and interpreting the desired signals.

Most VHF-UHF receivers are equipped with rather good AGC systems that effectively hold detector output constant within a few db through an extremely wide range of input signal power levels. The AGC action reduces receiver gain as the input signal level is increased and gives a corresponding reduction in the noise level at the detector output. It has been found that the squelch action of an AGC equipped receiver having a noise squelch circuit 22, as shown in FIGURE 1, has a squelch action closely approximating a carrier to noise squelch. In this squelch system the AGC system and receiver staging effectively operate as a limiter to the detector. With audio modulation components present in the output of the receiver detector 16 and passed to audio circuitry, a highpass filter or bandpass filter 21 attenuates the audio modulation and passes noise components to noise amplifier 23.

The cut-off threshold frequency of filter 21 is near the upper 3 db point of the audio passband and is normally adjusted experimentally to minimize the effects of modulation on the noise detector 24 D.C. output. The frequency response of the noise amplifier 23 extends from the upper end of the audio range to, normally, at least one-half the I-F band width. This insures that most of the available noise is amplified and substantially all modulation components, not blocked by filter 21, are attenuated.

The noise detector 24 converts the noise from the amplifier 23 to a D.C. voltage which varies in accordance with the available noise from amplifier 23 and out of detector 16. This detector can be arranged so that a decrease in noise power at the input produces an increase in D.C. voltage at the output. This output, of course, is conveniently connected to a Schmitt trigger 25 arranged to provide a fast snap action turn-on and turn-off of the receiver audio gate 17, at predetermined noise threshold levels out of detector 16.

Use of a Schmitt trigger circuit, or another of many such trigger circuits, having a "hysteresis" effect is advantageously utilized for optimum performance in the presence of weak signals having a changing level due to fading, or altitude changes of an aircraft. Resistor 45 is used in the squelch trigger 25 to provide an optimized turn-on snap action and hysteresis delayed turn-off effect. This trigger hysteresis also helps minimize effects of carrier shift and/or modulation components encountered with heavily modulated signals. Again it may be noted that the modified Schmitt trigger 25 is "fail safe" with failure of any stage ahead of the trigger stage input resulting in squelch gate 17 being biased on to pass audio. Of course, there are many solid state or relay devices which may be employed for gate circuit 17 in place of the particular gate shown. The threshold of the squelch may be adjusted by varying resistor 26 and is a function of the I-F bandwidth along with the noise passing characteristics of the filter 21, noise amplifier 23 gain, noise detector 24 gain and operating point, and trigger 25 turn-on and turn-off voltages.

Squelch threshold control has been found to provide a useful range from approximately 1.2 to 15 microvolts (open circuit) for the turn-on threshold of a VHF receiver, as shown in FIGURE 1. A lower threshold limit was set by the biasing and gain of noise detector 24 while the upper limit was set by maximum noise amplifier 23 gain. A lower limit than the 1.2 microvolts could possibly be obtained by increasing the gain of noise detector 24, changing its bias point, and by appropriate temperature compensating techniques. However, listening tests have indicated that a lower threshold level than 1.2 microvolts is not required for normal receiver use. A noise generator output has been applied to the I-F of FIG- URE 1, and with the amount of noise varied, the effect on turn-on threshold and output signal-plus-noise to noise ratio recorded.

| RF signal required to turn-on audio | Output S+N/N ratio for 30 percent modulation by 1 kc. audio, db |
|---|---|
| 1.5 uv (no external noise) | 6 |
| 10 uv (external noise setting No. 1) | 9 |
| 100 uv (external noise setting No. 2) | 10 |
| 1,000 uv (external noise setting No. 3) | 10.5 |
| 10,000 uv (external noise setting No. 4) | 11 |
| 3.0 uv (no external noise) | 11.5 |
| 10 uv (external noise setting No. 1') | 13 |
| 100 uv (external noise setting No. 2') | 14 |
| 1,000 uv (external noise setting No. 3') | 14 |
| 10,000 uv (external noise setting No. 4') | 14 |

The effect of over-all gain change of the entire receiver is of interest. Actual gain change was measured by using a reference AGC voltage and the results recorded are indicated in the following table. It is of interest to note that the signal-plus-noise to noise ratio remained nearly constant throughout a gain variation of 23 db.

*Effects of overall gain changes*

| Turn-on threshold | S+N/N ratio (30 percent modulation) | Overall gain change | Input voltage (volts D.C.) |
|---|---|---|---|
| 0 uv | | −20 db | 23.5 |
| 1.5 uv | 6.0 db | −13 db | 24.5 |
| 1.75 uv | 6.5 db | −7 db | 25.5 |
| 2 uv | 7.5 db | −3 db | 26.5 |
| 2 uv | 7.5 db | 0 db | 27.5 |
| 2.2 uv | 7.75 db | +4.5 db | 28.5 |
| 2.4 uv | 8.5 db | +10 db | 30.0 |

Components used in the filter circuit 22 and audio gate 17 of FIGURE 2 and the receiver tested include the following:

| | | |
|---|---|---|
| Capacitor **21** | μf | 0.01 |
| Resistor **26** | ohms | 50K |
| Transistor **27** | | 2N697 |
| Resistor **28** | ohms | 15 K |
| Resistor **29** | do | 4.7K |
| Capacitor **30** | μf | 2.2 |
| Resistor **31** | ohms | 1K |
| Resistor **32** | do | 2.2K |
| Capacitor **33** | μf | 0.001 |
| Capacitor **34** | μf | 0.005 |
| Transistor **35** | | 2N697 |
| Resistor **36** | ohms | 68K |
| Resistor **37** | do | 6.8K |
| Resistor **38** | do | 1.5K |
| Thermistor **39** | do | 1K |
| Resistor **40** | do | 27 |
| Resistor **41** | do | 3.3K |
| Capacitor **42** | μf | 4.5 |
| Resistor **43** | ohms | 8.2K |
| Transistor **44** | | 2N697 |
| Resistor **45** | ohms | 68K |
| Transistor **46** | | 2N697 |
| Resistor **47** | ohms | 1.5K |
| Resistor **48** | do | 1.5K |
| Resistor **49** | do | 22K |
| Resistor **50** | do | 470 |
| Resistor **51** | do | 10K |
| Diode **52** | | IN457 |
| Capacitor **53** | μf | 0.1 |
| Capacitor **54** | μf | 0.1 |
| Resistor **55** | ohms | 10K |
| Resistor **56** | do | 10K |
| Resistor **57** | do | 12K |
| B+supply | v. D.C. | +20 |

In the embodiment of FIGURE 3 components similar to those in FIGURE 1 are, for the sake of convenience, numbered the same. Tuned RF receiver 10', of FIGURE 3, receives an RF signal from antenna 11. The RF signal is fed through tuned RF amplifier 12', to detector 16. An AGC circuit 20' provides for applying automatic gain control signal voltage, derived from detector 16, to tuned RF amplifier 12' in a conventional manner. Audio output of detector 16 is passed successively through the gate 17, when not squelched, and audio amplifier 18 to speaker 19. The detector 16 output is also applied to filter 21 of squelch circuit 22. Squelch circuit 22 is indicated to be the same as with the FIGURE 1 embodiment although, other similar action circuits may be employed by those skilled in the art. For example, other transistor trigger actuated gate circuits, perhaps a tunnel diode circuit adaptation, could be utilized in place of the Schmitt trigger 25 and gate circuit 17 of FIGURE 2.

Referring now to FIGURE 4, a carrier squelch override is added to the radio receiver 10 embodiment in addition to the squelch circuit 22 of FIGURES 1 and 2. An extension of the AGC circuit is passed through normalizing circuit 60 and diode 61 to the input of Schmitt trigger 25. In addition, a reverse blocking diode 62 is provided in the noise detector 24 output line to prevent back-loading of squelch circuit 22 when the over-ride carrier squelch circuit starts functioning. Such a carrier over-ride squelch may be employed where two RF carriers are likely to be occasionally received simultaneously by the radio receiver 10, with the carriers having amplitudes of like magnitude, and with a difference frequency above the lower threshold of filter 21. Under such conditions the embodiment of FIGURE 1, without carrier over-ride added, normally will remain squelched with audio off.

Certain VHF receivers in commercial air lines usage are subject to occasionally receiving two carriers under the conditions set forth immediately above. The FIGURE 4 carrier over-ride circuit prevents loss of communication capability by providing for continued audio when this two-carrier situation arises. The operational level of the carrier over-ride squelch is normally set to take over receiver squelch at a somewhat higher level than the highest normally expected external ambient noise level. For example, a typical VHF receiver might be squelched at 2 microvolts when no external noise is present, and the highest noise level encountered and sensed, particularly with an aircraft flying over a noise city, would probably not be over 8 microvolts. With these normally expected noise levels the carrier over-ride squelch could be set to take over and insure audio for all input signal levels above 10 microvolts. Thus, the advantages of the FIGURE 1 squelch system would be retained for substantially all signals below 10 microvolts, where that type of squelch operation is most advantageous. For signals about a 10 microvolt threshold, with two or more carriers being received simultaneously, the squelch performance may be similar to conventional carrier squelch except for the receiver radio being subject to squelch control by the squelch of FIGURE 1 up to the 10 microvolt threshold. Of course, with some receivers the AGC power range would be such that a normalizing circuit 60 would not be required, for some receivers having a low AGC power range the normalizing circuit would be an amplifier, and when the AGC power range is high the normalizing circuit may be an attenuator. Furthermore, the orientation of diodes 61 and 62 may be reversed, depending upon whether the AGC system were a negative going AGC rather than a positive going AGC, and/or whether the Schmitt trigger, or any other trigger configuration substituted, were biased differently than with the particular trigger 25 shown.

Whereas this invention is here illustrated and described with respect to several RF receiver squelch embodiments that turn on receiver audio when the signal is intelligible and leaves audio off when there is no intelligible signal, it should be realized that various changes may be made without departing from the essential contributions to the art made by the teachings hereof.

I claim:

1. A radio receiver having a first squelch system depending on the noise-quieting action of an AGC circuit in the receiver and with said first squelch system acting on noise out of a receiver detector, and having an over-ride squelch set to provide continued audio with input signal levels above a predetermined signal threshold level wherein, said receiver includes: an RF amplifier; an AGC circuit; a detector; an audio circuit connected to said detector and having gating means; squelch circuit means of said first squelch system connected to said receiver detector and said gating means for controlling said gating means in response to variation in the noise out of the receiver detector through a predetermined power level while the input remains below said predetermined input signal threshold level; and over-ride squelch circuit means connected to said AGC circuit and said gating means for insuring continued audio above said predetermined input signal threshold level.

2. The radio receiver of claim 1 wherein, said squelch circuit means of said first squelch system includes: above audio noise passing and audio blocking means; noise amplifier means; noise detecting means; and noise detector output signal level responsive means for controlling said gate means.

3. The radio receiver of claim 2 wherein, said over-ride squelch circuit means includes: a diode connected to the AGC circuit, and to said noise detector output signal level responsive means for controlling said gate means.

4. The radio receiver of claim 3 including reverse current blocking means between said noise detecting means and said noise detector output signal level responsive means for controlling said gate means.

References Cited by the Examiner

UNITED STATES PATENTS

| | | | |
|---|---|---|---|
| 2,630,527 | 3/53 | Vilkomerson | 325—478 |
| 2,930,890 | 3/60 | Lenk | 325—319 |
| 3,079,558 | 2/63 | Spencer | 325—478 |
| 3,098,972 | 7/63 | Howard | 325—319 |

DAVID G. REDINBAUGH, *Primary Examiner.*